J. G. & G. R. INSHAW.
APPARATUS FOR PILGERING METAL BLOOMS, &c.
APPLICATION FILED AUG. 5, 1910.

995,427.

Patented June 13, 1911.

5 SHEETS—SHEET 1.

WITNESSES

INVENTORS
John George Inshaw
George Richard Inshaw
by Howson and Howson, attys

J. G. & G. R. INSHAW.
APPARATUS FOR PILGERING METAL BLOOMS, &c.
APPLICATION FILED AUG. 5, 1910.

995,427.

Patented June 13, 1911.
5 SHEETS—SHEET 3.

WITNESSES
L. H. Grote
M. E. Keir

INVENTORS
John George Inshaw
George Richard Inshaw
by Howson and Howson, attys

J. G. & G. R. INSHAW.
APPARATUS FOR PILGERING METAL BLOOMS, &c.
APPLICATION FILED AUG. 5, 1910.

995,427.

Patented June 13, 1911.

5 SHEETS—SHEET 4.

WITNESSES

INVENTORS
John George Inshaw
George Richard Inshaw
by Howson and Howson
attys

J. G. & G. R. INSHAW.
APPARATUS FOR PILGERING METAL BLOOMS, &c.
APPLICATION FILED AUG. 5, 1910.
995,427.
Patented June 13, 1911.
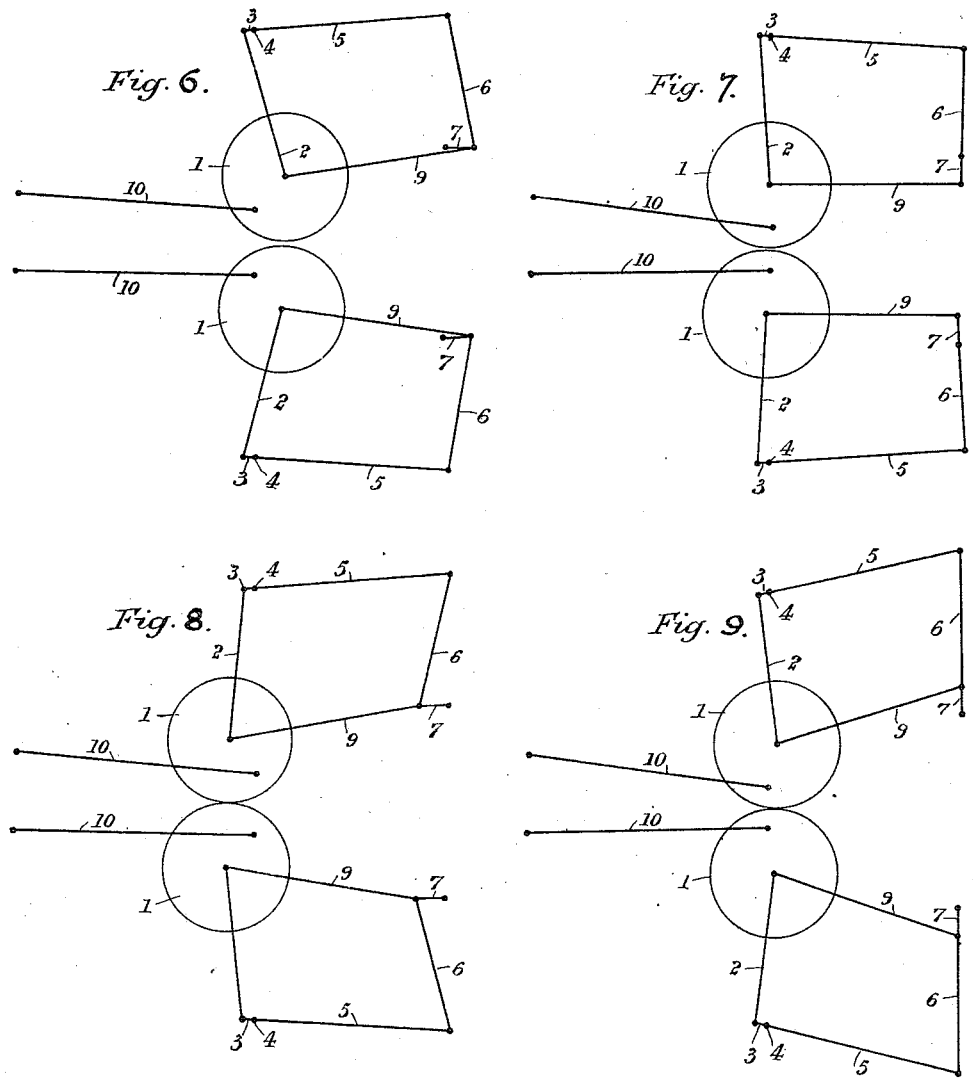

UNITED STATES PATENT OFFICE.

JOHN GEORGE INSHAW AND GEORGE RICHARD INSHAW, OF UDDINGSTON, SCOTLAND, ASSIGNORS OF ONE-HALF TO CHARLES SHAW, OF WOLVERHAMPTON, ENGLAND, AND WILLIAM EDWARD ANDREW, OF WILMSLOW, ENGLAND.

APPARATUS FOR PILGERING METAL BLOOMS, &c.

995,427.  Specification of Letters Patent.  Patented June 13, 1911.

Application filed August 5, 1910. Serial No. 575,846.

*To all whom it may concern:*

Be it known that we, JOHN GEORGE INSHAW and GEORGE RICHARD INSHAW, subjects of the King of Great Britain and Ireland, both of The Grange, Uddingston, in the county of Lanark, Scotland, have invented new and useful Improvements in Apparatus for Pilgering Metal Blooms, Tubes, or Rods, of which the following is a specification.

This invention relates to apparatus for pilgering metal blooms, tubes, or rods, the apparatus being of the kind in which the operating devices, or "rolls," are caused to approach and recede from one another, the object of the invention being to provide an improved constructon of such apparatus which is adapted to effect the pilgering in a more rapid and efficient manner than hitherto, and in which friction of the pilgering devices, or "rolls," in their housings is considerably reduced.

We will describe an apparatus constructed in accordance with this invention, reference being made to the accompanying drawings.

Figure 1:
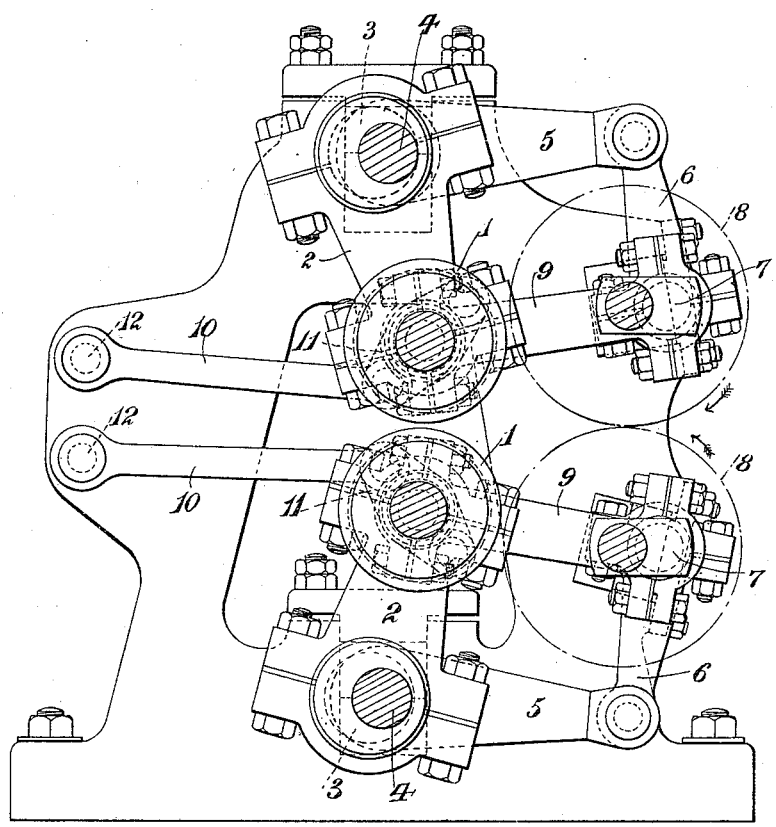
Figure 2:
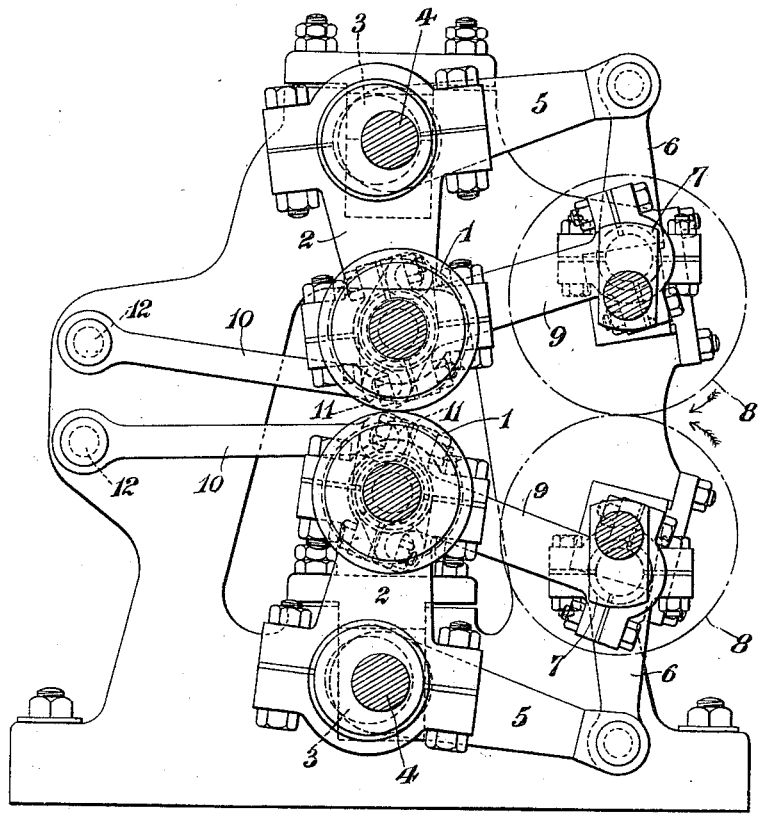
Figure 3:
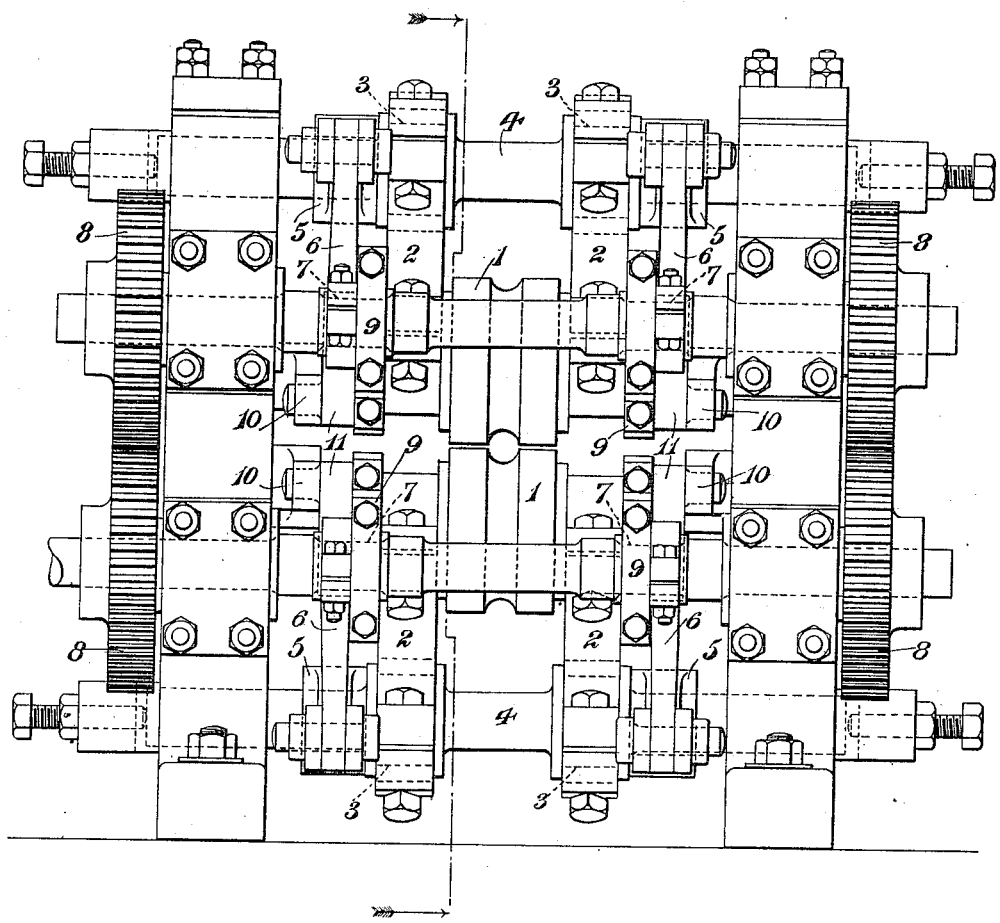
Figure 4:
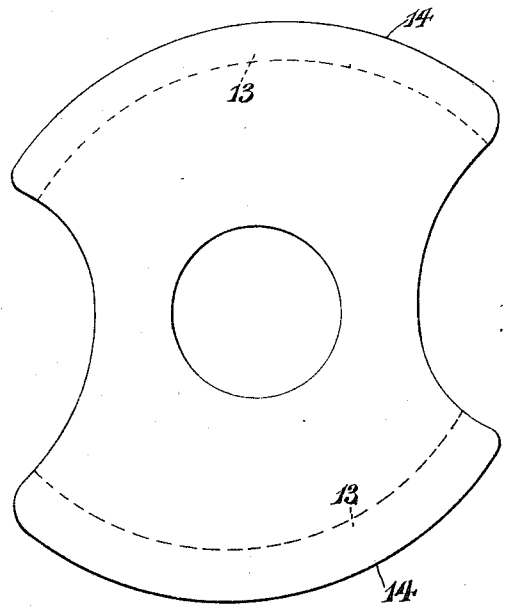
Figure 5:
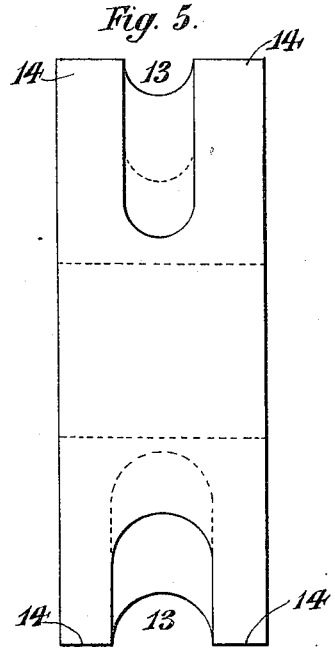
Figure 4:
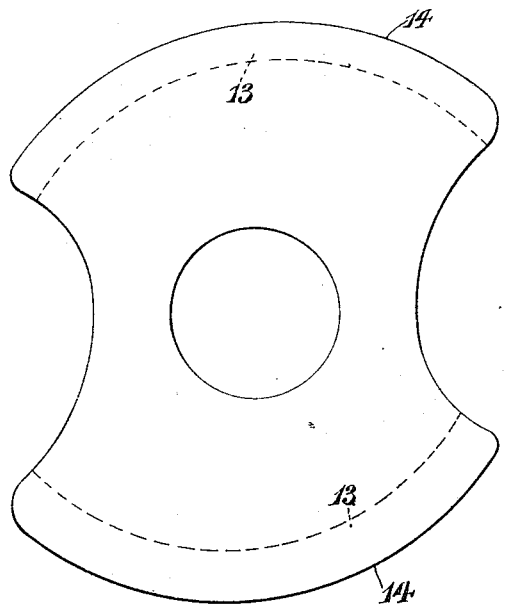
Figure 5:
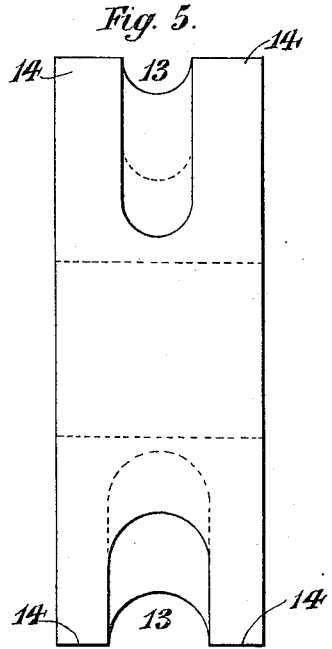

Figures 1 and 2 are transverse vertical sections on the line 1—2, Fig. 3 respectively showing the parts in the position when the pilgering devices, or "rolls," are not in contact with the work, and when they are in contact with the work. Fig. 3 is an elevation at right angles to Figs. 1 and 2. Figs. 4 and 5 show, in elevation at right angles to each other (drawn to a larger scale) one of the pilgering devices, or "rolls," but slightly modified as hereinafter described. Figs. 6 to 9 inclusive form a series of diagrams showing the positions of the cranks, arms and eccentrics for each quarter revolution of the cranks 7.

Repetitions of the mechanism we hereinafter describe are, of course, situated above and below, and on either, or both, sides of, the "pass," but it will only be necessary for us to describe one set of mechanism (which we presume to be an upper set), as the other set, or sets, can be similarly arranged and are so illustrated corresponding parts being marked with the same reference numerals.

The pilgering device, or "roll," 1 is carried in bearings at, or toward, the ends of arms 2 at each side. The other ends of these arms 2 are acted upon by eccentrics 3 on a shaft 4, which can be operated so as to give the requisite movements of the pilgering device, or "roll," toward and away from the work. The said eccentrics are shown as being operated by arms 5 connected by a link 6 to a crank 7, driven by any suitable means, such as by the toothed wheels 8, operated from any suitable motor. The crank 7 is connected, by a connecting rod 9, to the action of the pilgering device, or "roll," and effects the reciprocation of the said pilgering device, or "roll." The partial rotation of the latter can be effected by a link 10 connected, at one end, to a crank 11 on the pilgering device, or "roll," and, at the other end, to a center-pin 12 at a fixed point on the frame. The arrangement is such that the operating movement of the pilgering devices, or "rolls," is effected when the said devices, or "rolls," are in contact with the work, and the return movement is effected when the pilgering devices, or "rolls," are out of contact with the work.

The pilgering devices, or "rolls," have the requisite eccentric, or snail-like, formation on the parts of their peripheral faces which are grooved and operate on the work, and the remainder of the peripheries of the said devices, or "rolls," may be plain, or be absent to any convenient extent, or the said pilgering devices, or "rolls," may, as shown in Figs. 4 and 5 of the accompanying drawings, be made so that the remainder of their peripheral faces are formed and grooved to constitute portions to act upon blooms, tubes, or rods, of another size, or of other sizes, or separate apparatus, or pilgering devices, or "rolls," can be used for each size of blooms, tubes, or rods.

The requisite eccentric, or snail-like, formation, of the peripheral grooves hereinbefore referred to is shown at 13 in Fig. 4 of the accompanying drawings, and it is of course understood that the collars, or flanges, 14 would be of corresponding eccentric, or snail-like formation, so that at the point of contact with the work they are at the same relative distance apart.

The cranks 11 hereinbefore referred to are suitably secured to, and rotate with, the pilgering devices, or "rolls", and each has an extension which constitutes the crank for operating the pilgering devices, or "rolls", when the latter are turned for the purpose of bringing another grooved portion thereof into operation, the means of connection of the links 10 to either of the ends of the cranks being interchangeable. The framing can be arranged in any suitable way.

The operation of the apparatus is as follows:—Presuming that the position of the parts is that shown in Fig. 1 of the drawings and that an ingot to be operated upon is being fed into the pass formed in the now partially receded pilgering devices, or "rolls" 1, 1, then an approximately quarter rotation of the toothed wheels 8, 8, in the direction indicated by the arrows, causes the cranks 7, 7, through the links 6, 6, and arms 5, 5, to rock the shafts 4, 4, and the eccentrics 3, 3, mounted thereon, so that the arms 2, 2, mounted on the said eccentrics and carrying the pilgering devices, or "rolls" 1, 1, cause the said pilgering devices, or "rolls" to recede to their full extent, and simultaneously therewith the cranks 7, 7, through the connecting rods 9, 9, move forward the arms 2, 2, carrying the pilgering devices 1, 1, and at or about the completion of these portions of the movements of the parts the feeding of the ingot is stopped. A further approximately quarter rotation of the cranks 7, 7, rocks the shafts 4, 4, and the eccentrics 3, 3, mounted thereon in the reverse direction so that the pilgering devices, or "rolls", carried by the arms 2, 2, on the said eccentrics 3, 3, are caused to approach one another, at the same time the connecting rods 9, 9, have moved the arms 2, 2, to their extreme forward position. The pilgering devices or "rolls" at or about the commencement of the next approximately quarter rotation of the cranks 7, 7, are brought by the eccentrics 3, 3, into contact with the ingot and press the said ingot between them, the pressure gradually increasing by the action of the said eccentrics the limit of which is reached at, or about, the completion of this quarter of a rotation, at the same time the cranks 7, 7, have, through the rods 9, 9, caused the arms 2, 2, to swing backward so that the pilgering devices, or "rolls" are moved along the work as they approach each other. The position of the parts, at the completion of this quarter rotation of the cranks is that shown in Fig. 2. The pilgering devices, or "rolls", are, at or about the commencement of the last approximately quarter rotation of the cranks 7, 7, caused to gradually recede from each other while at the same time the rods 9, 9, are still continuing to move the arms 2, 2, backward until this quarter rotation is completed when the parts are then in the position shown in Fig. 1. The ingot can be fed forward at any time that the pilgering devices, or "rolls", are not in contact with the said ingot. The partial rotation of the pilgering devices or "rolls" is effected by the reciprocation of the said pilgering devices, or "rolls" and links 10, 10, connected at one end to cranks 11, 11, secured to the pilgering devices or "rolls" and connected at the other end by pins 12, 12, to the frame of the apparatus.

Having now particularly described and ascertained the nature of the said invention and in what manner the same is to be performed, we declare that what we claim is:

In pilgering apparatus of the character described, a pilgering roll, arms with bearings in one end between which said roll is mounted, a shaft with eccentrics upon which the other ends of said arms are mounted, a crank shaft and means in connection therewith for rocking said eccentrics whereby the latter are caused to act upon said arms to give the requisite movements of the pilgering roll toward and away from the work, in combination with rods connected to the aforesaid crank shafts and to the said pilgering roll, adapted to reciprocate the latter, together with a link pivoted at one end on a stationary center and at the other end eccentrically to said pilgering roll whereby the latter is partially rotated as it reciprocates, all substantially as hereinbefore described and illustrated in the accompanying drawings.

In testimony whereof we have signed our names to this specification in the presence of two subscribing witnesses.

JOHN GEORGE INSHAW.
GEORGE RICHARD INSHAW.

Witnesses:
RALPH INSHAW,
FREDERICK C. INSHAW.